Dec. 10, 1929. O. C. THOMPSON 1,738,806
MACHINE FOR USE IN MAKING BOXES
Filed March 5, 1925 9 Sheets-Sheet 1

Inventor
Osceola C. Thompson
By his Attorney Edward Dunne Jr.

Dec. 10, 1929.   O. C. THOMPSON   1,738,806
MACHINE FOR USE IN MAKING BOXES
Filed March 5, 1925   9 Sheets-Sheet 3

Dec. 10, 1929. O. C. THOMPSON 1,738,806
MACHINE FOR USE IN MAKING BOXES
Filed March 5, 1925 9 Sheets-Sheet 5

Inventor
Osceola C. Thompson
By his Attorney Edward Dunne Jr.

Dec. 10, 1929. O. C. THOMPSON 1,738,806
MACHINE FOR USE IN MAKING BOXES
Filed March 5, 1925   9 Sheets-Sheet 6
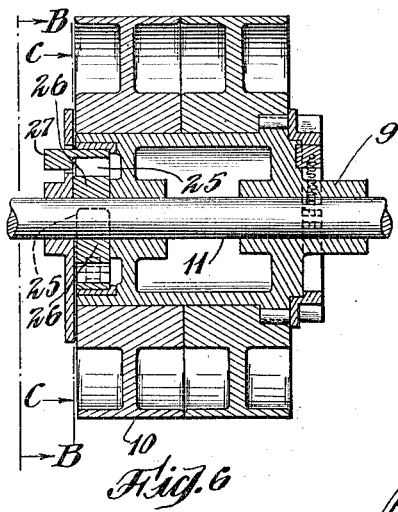
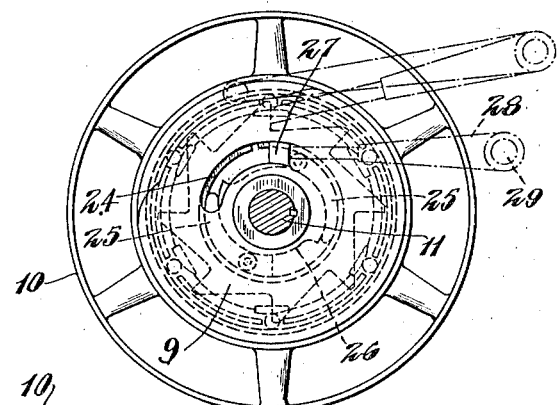
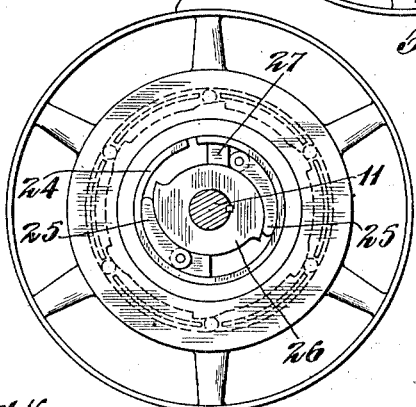
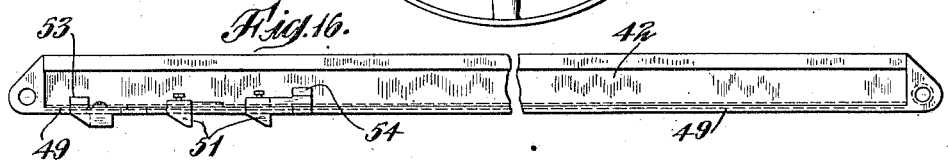
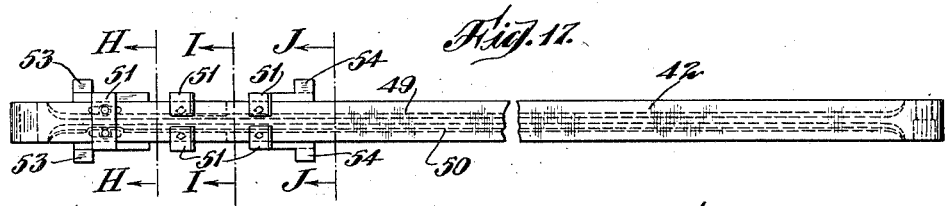
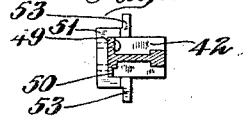
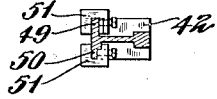
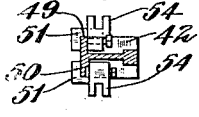
Inventor
Osceola C. Thompson
By his Attorney Edward Dunne Jr.

Dec. 10, 1929.  O. C. THOMPSON  1,738,806
MACHINE FOR USE IN MAKING BOXES
Filed March 5, 1925   9 Sheets-Sheet 7
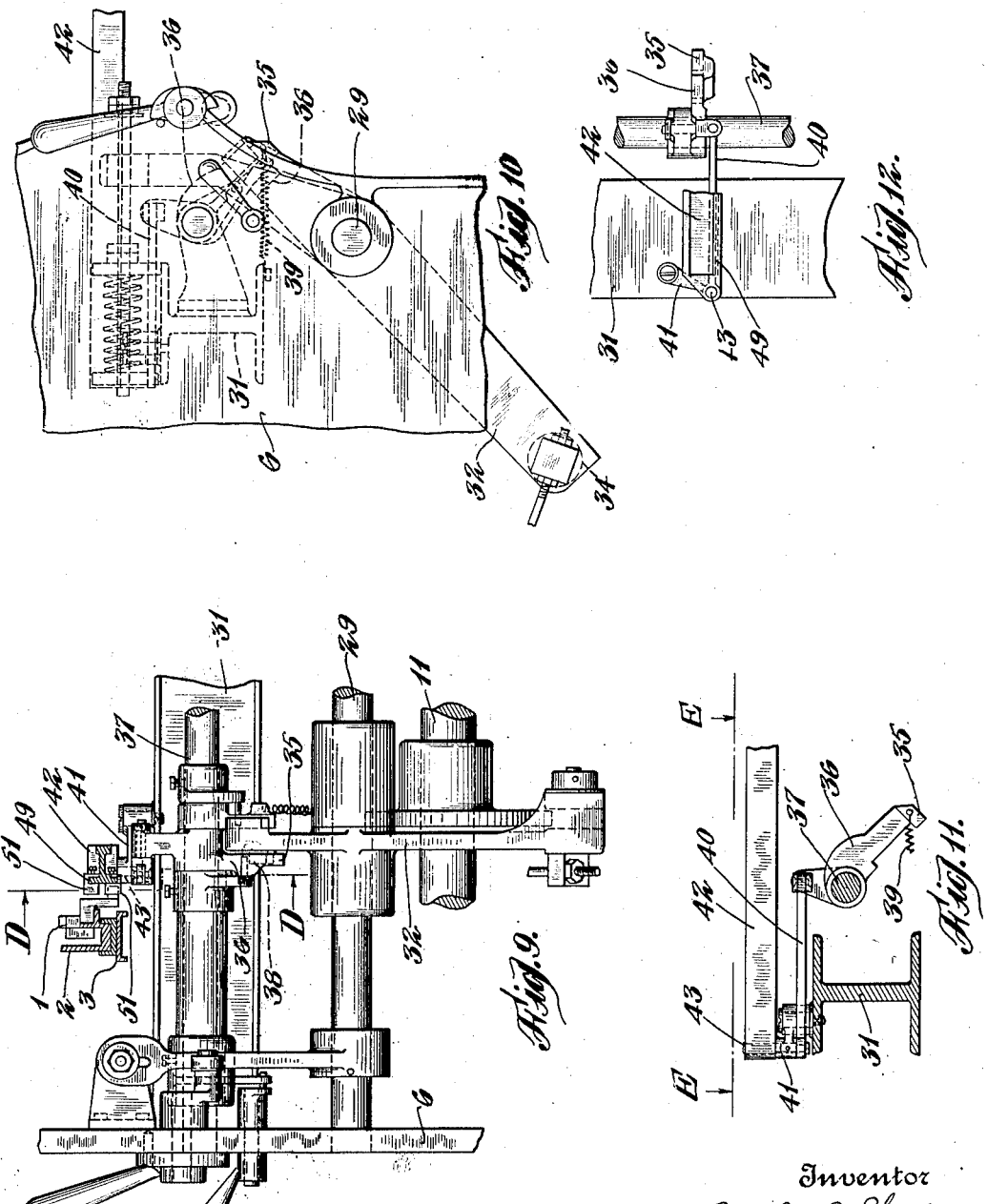
Inventor
Osceola C. Thompson
By his Attorney Edward Dunne Jr.

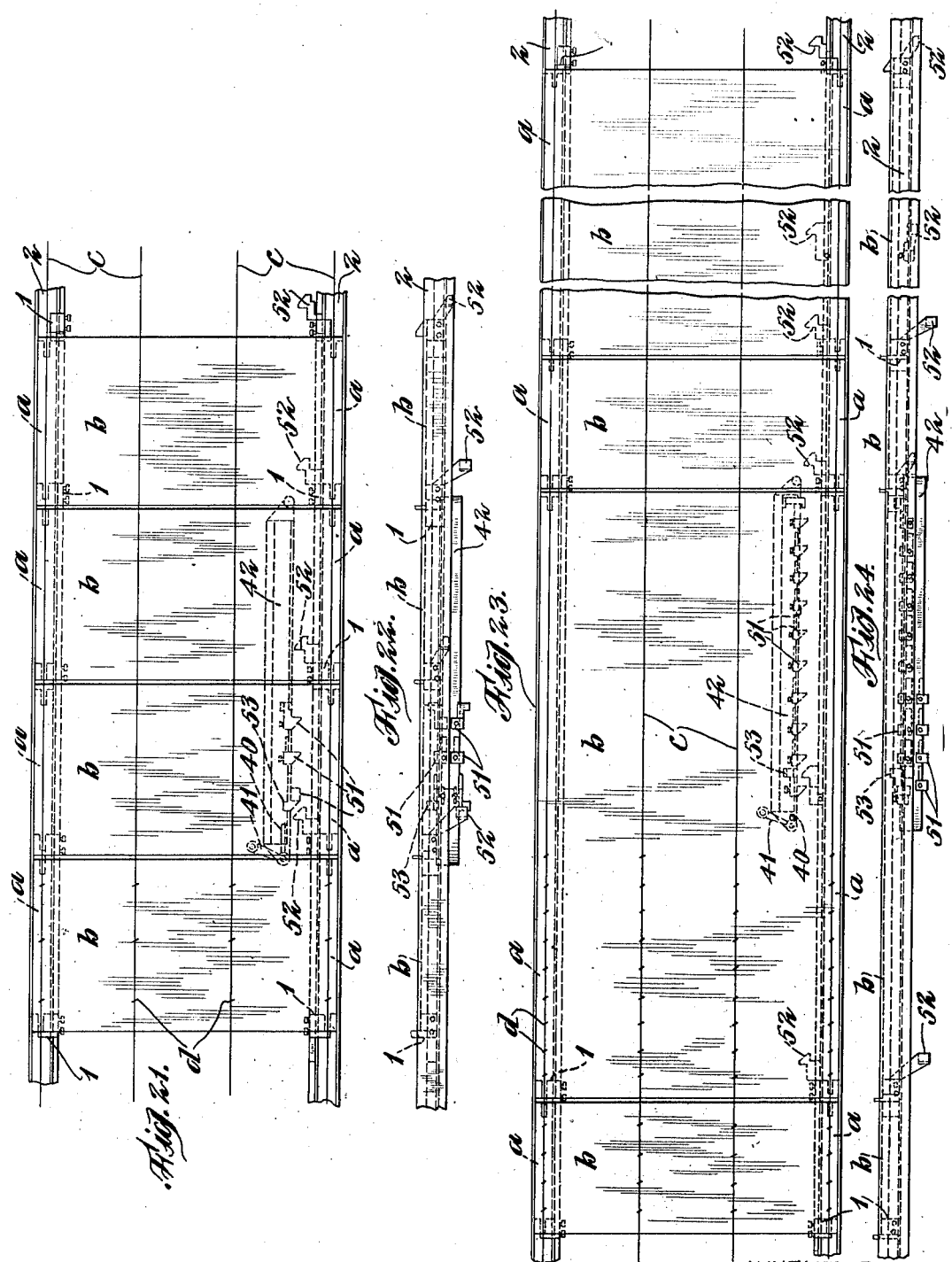

Dec. 10, 1929.  O. C. THOMPSON  1,738,806
MACHINE FOR USE IN MAKING BOXES
Filed March 5, 1925   9 Sheets-Sheet 9
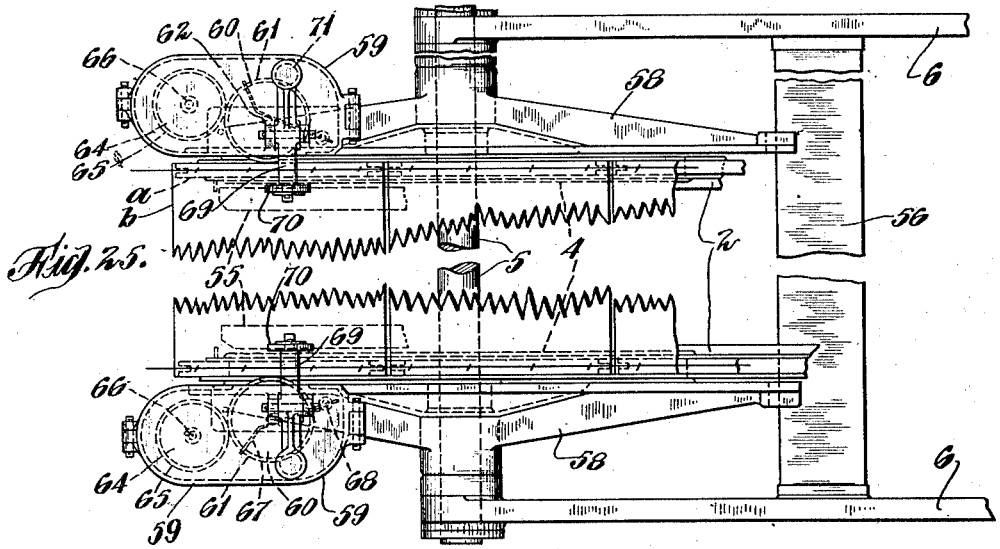
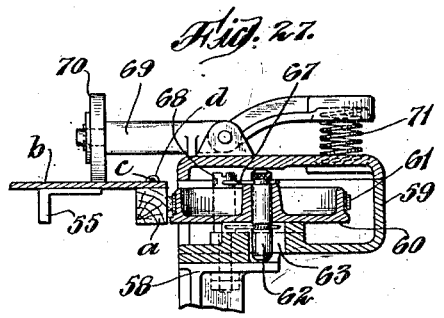
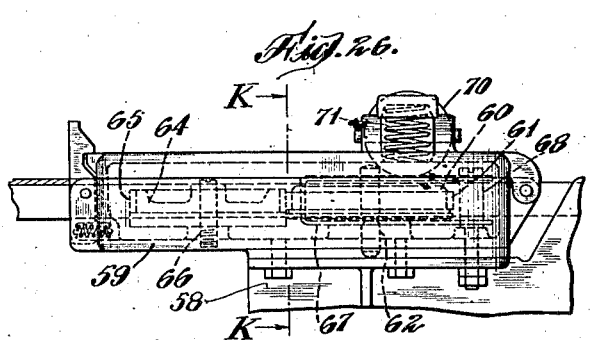
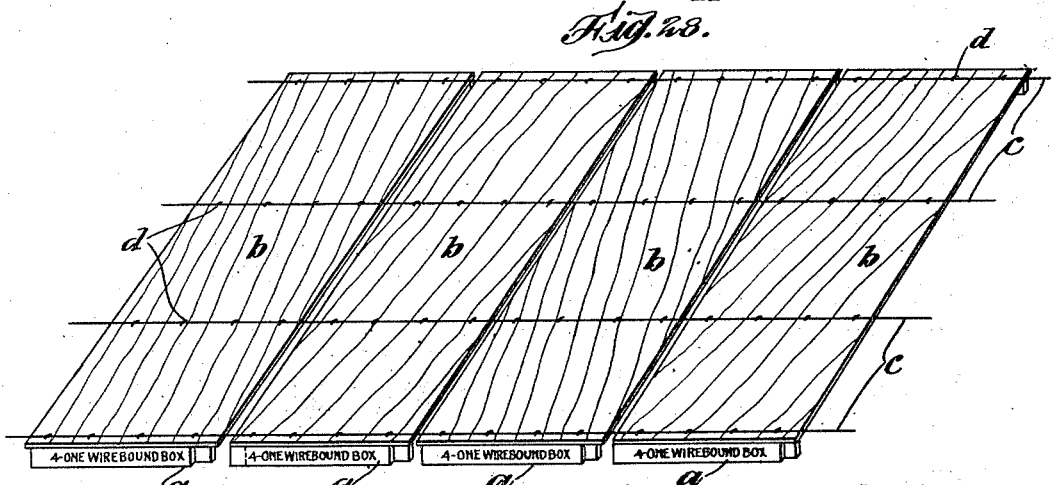
Inventor
Osceola C. Thompson
By his Attorney Edward Dunne Jr.

Patented Dec. 10, 1929

1,738,806

UNITED STATES PATENT OFFICE

OSCEOLA C. THOMPSON, OF MOUNTAIN LAKES, NEW JERSEY, ASSIGNOR TO WIRE-BOUNDS PATENTS COMPANY, A CORPORATION OF MAINE

MACHINE FOR USE IN MAKING BOXES

Application filed March 5, 1925. Serial No. 13,304.

My invention relates to machines for use in making boxes, crates, box or crate blanks and parts thereof, and particularly to machines for making wire-bound box or crate blanks and parts thereof.

Among other objects, my invention is intended to provide a machine of the class described with improved means for controllably locating the fasteners which are driven into the box parts, and with means for printing the box parts as they pass through the machine.

In the drawings,

Fig. 6 is an enlarged vertical section of a portion of the stapler-operating shaft and pulleys thereon, showing the clutch connection between the drive pulley and its hub and the clutch connection between the hub of the drive pulley and the stapler-operating shaft.

Fig. 7 is an end view seen from B—B in Fig. 6.

Fig. 8 is a sectional view taken on the line C—C of Fig. 6.

Fig. 9 is an enlarged front elevation of a portion of the machine, viewed from the right in Fig. 1 at a point immediately in front of the stapling mechanism, showing details of the stapler-control operating mechanism and the machine control levers.

Fig. 10 is a side elevation of a portion of the mechanism shown in Fig. 9.

Fig. 11 is a sectional view taken on the line D—D of Fig. 9.

Fig. 12 is a sectional view taken on the line E—E of Fig. 11.

Fig. 13 is a sectional plan view on the line F—F of Fig. 3.

Fig. 14 is a top plan view of the same.

Fig. 15 is a sectional view taken on the line G—G of Fig. 14.

Fig. 16 is a top plan view of the bar which controls the operations of the stapling mechanism.

Fig. 17 is a side elevation of the same.

Fig. 18 is a sectional view taken on the line H—H of Fig. 17.

Fig. 19 is a sectional view taken on the line I—I of Fig. 17.

Fig. 20 is a sectional view taken on the line J—J of Fig. 17.

Fig. 21 is a top plan view of a portion of the work-forwarding chains with material for a box-blank thereon and showing the work-positioning and fastener-controlling mechanism. In this figure, the chains are travelling toward the left.

Fig. 22 is a side elevation of the same.

Fig. 23 is similar to Fig. 21 but showing materials for a larger sized box-blank thereon.

Fig. 24 is a side elevation of the same.

Fig. 25 is a top plan view of the delivery end of the machine, showing the printing mechanism.

Fig. 26 is an enlarged side elevation of the printing mechanism shown in Fig. 25.

Fig. 27 is a sectional view taken on the line K—K of Fig. 26.

Fig. 28 is a perspective view of a wirebound box-blank which may be made on the illustrative machine.

Figure 1:
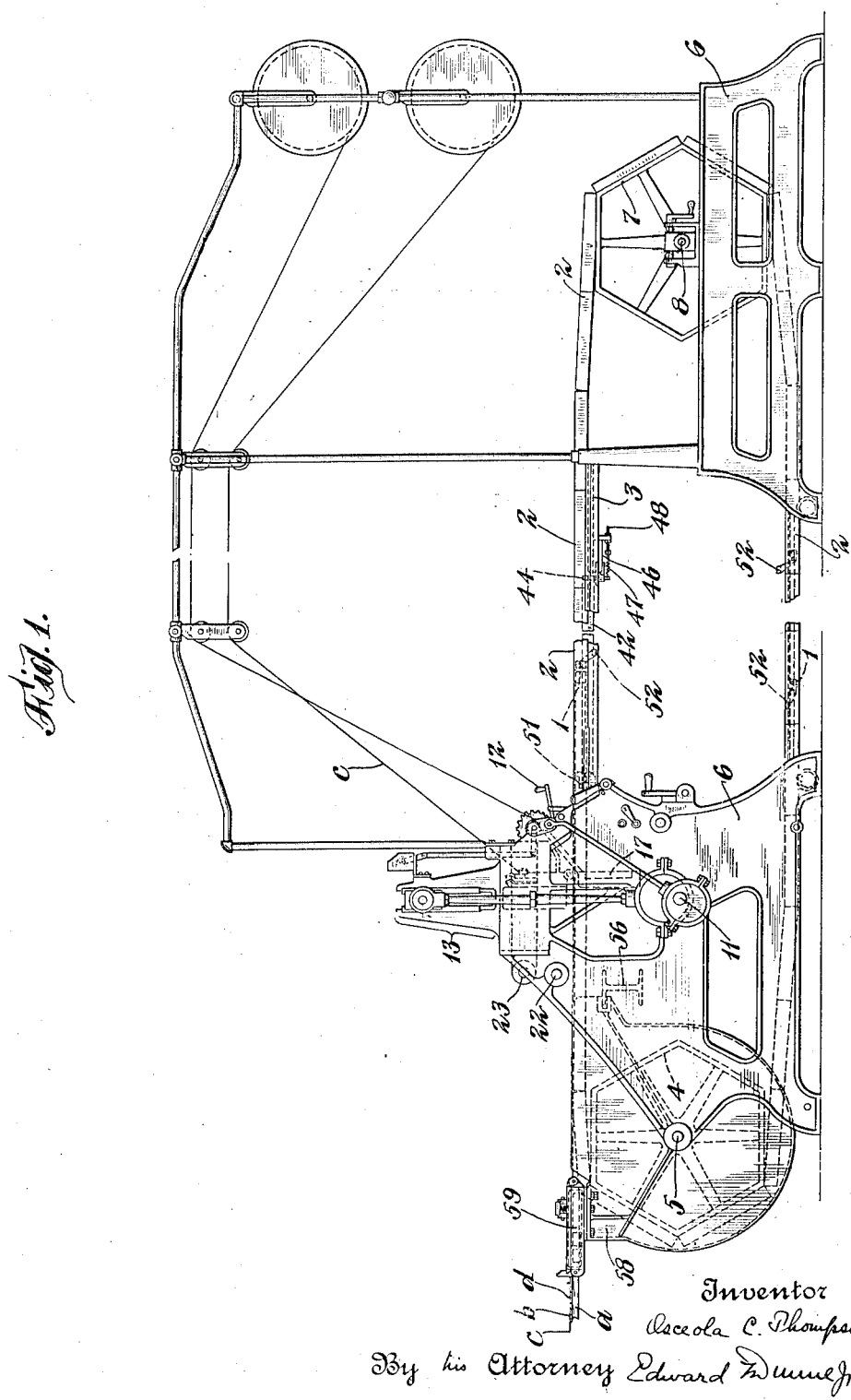
Fig. 1 is a side elevation of a wirebound box blank machine, embodying the invention.
Figure 2:
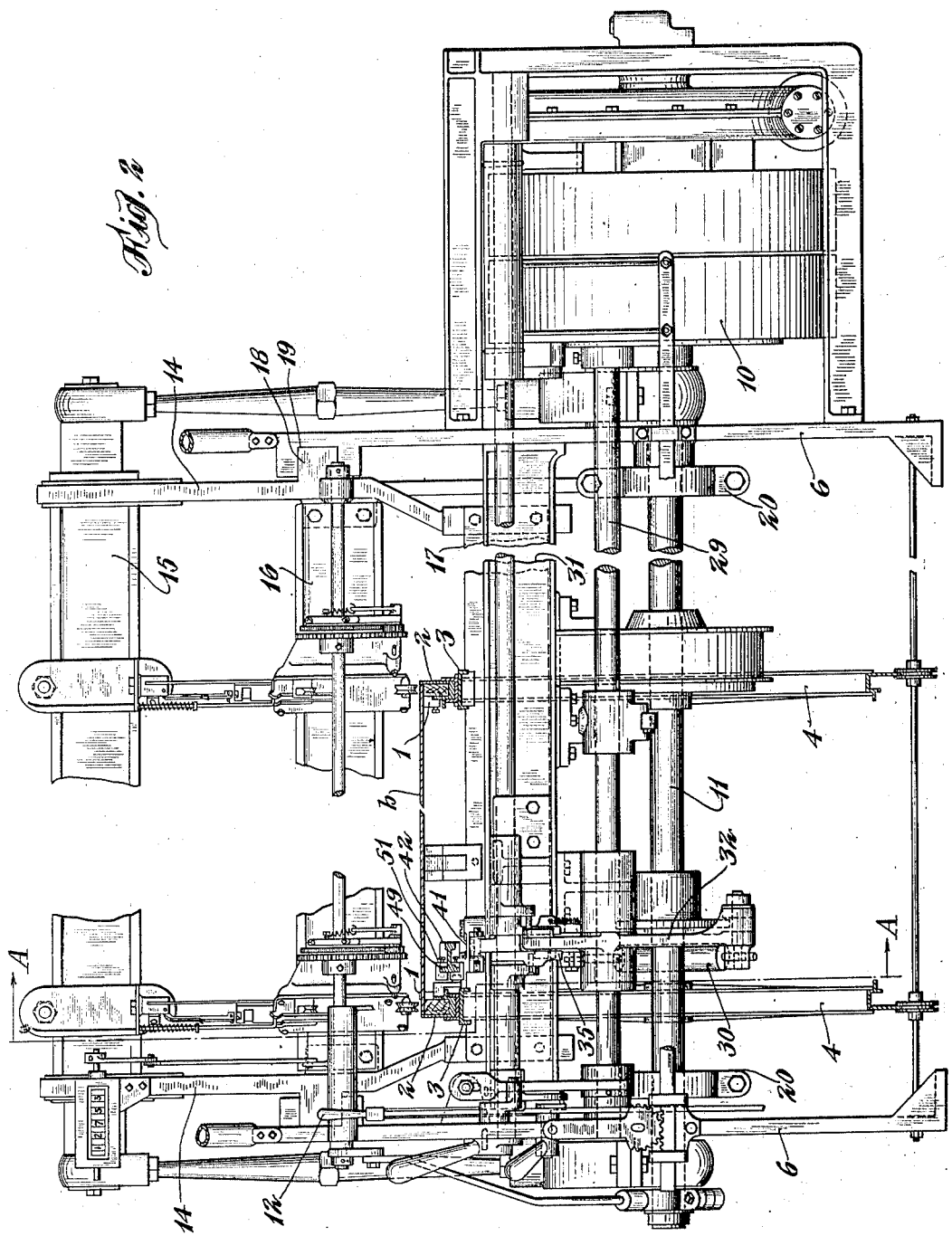
Fig. 2 is an enlarged front elevation of a portion of the illustrative machine viewed from the right in Fig. 1 at a point immediately in front of the stapling mechanism.
Figure 3:
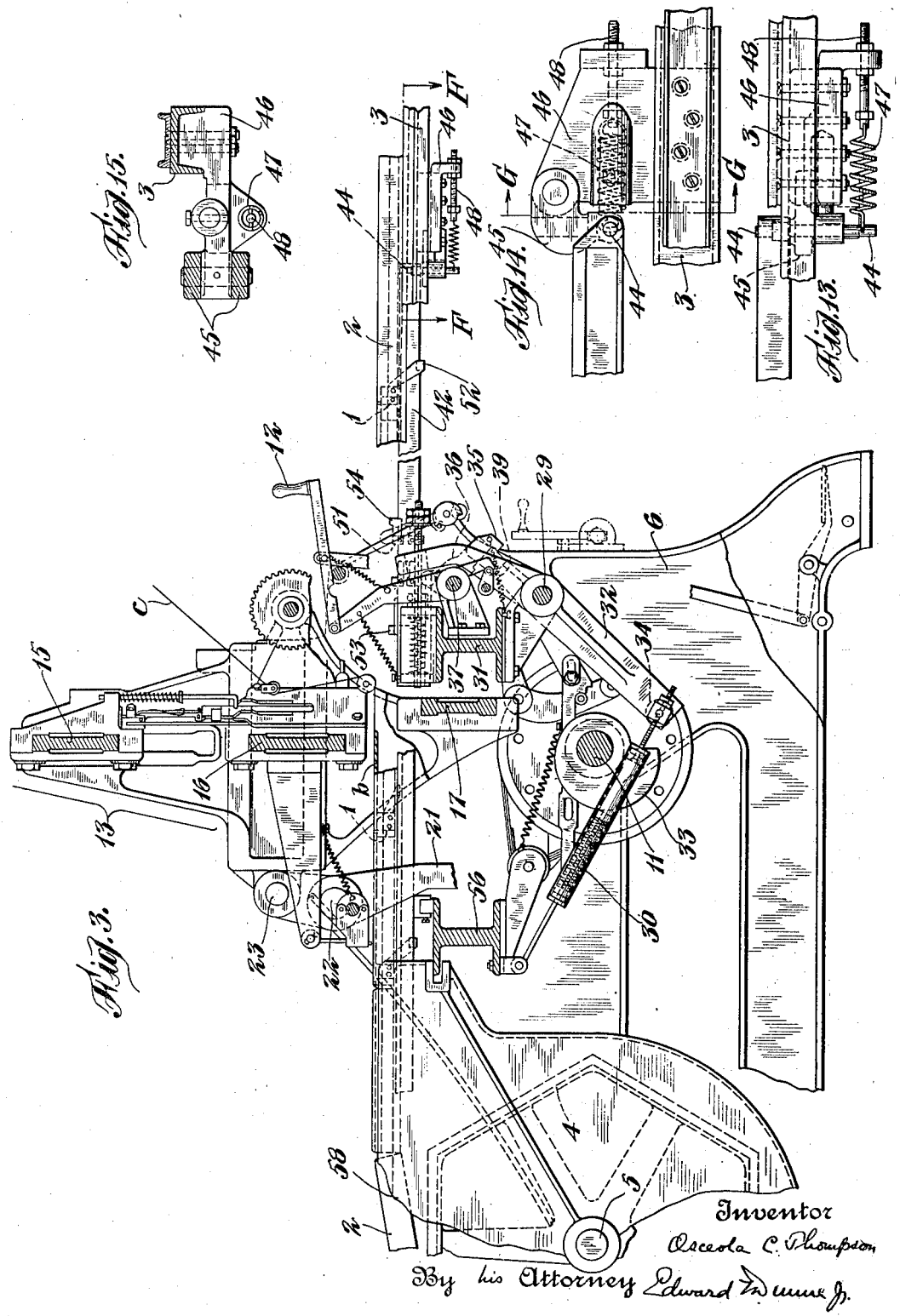
Fig. 3 is a side elevation, partly in section, of a portion of the machine viewed from the left in Fig. 2.
Figure 4:
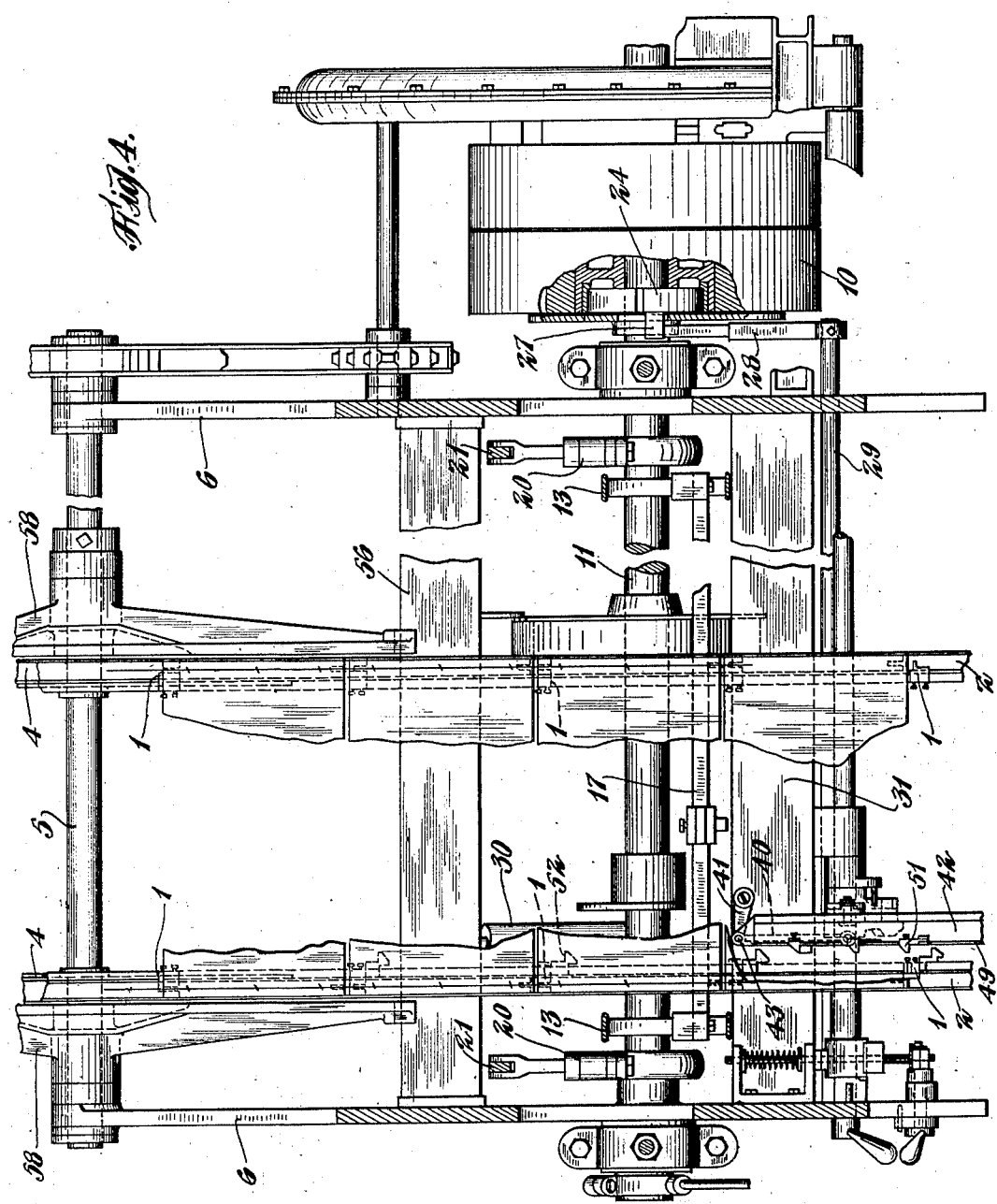
Fig. 4 is a plan view of a portion of the machine with certain parts left out for clearness of illustration.

The machine selected for illustration is of the type disclosed in U. S. patent to O. C. Thompson, No. 1,669,383 which issued May 8, 1928, on an application which was co-pending herewith, in which the box parts are assembled on endless conveyer chains and are fed continuously at substantially a uniform speed past staple-forming and driving mechanism which is caused to operate at selected times to drive staples into the moving work, the staples being driven astride of binding wire to secure the same to the box parts.

A product of the machine is illustrated in Fig. 28. Said figure discloses a wirebound box-blank consisting of four separate sections of cleats a and side sheets b connected together in foldable relationship by binding wires c secured to the several sections by staples d. The several sections may be of equal width, as shown in Fig. 28, in which event the blank will fold into a box which is square in cross section; or the first and third sections may be narrower or wider than the second and fourth sections, in which event the blank will fold into a box which is oblong in cross section.

The illustrative machine is designed to position the cleats and sheets of the several sections of the box-blank in foldable relationship and feed them past staple-forming and driving mechanism, which forms staples from staple stock wire automatically fed thereto and drives the staples over the binding wire into or through the wooden box elements.

The cleats a and side sheets b for the box-blank are positioned by spacer blocks 1 on conveyer chains 2, which chains 2 travel on supports 3 and are trained over driven sprocket wheels 4 fast on a shaft 5 journaled in side frames 6 at the delivery end of the machine, and over idler sprocket wheels 7 on a shaft 8 journaled in side frames 6 at the receiving end of the machine. Conveyer chains 2 are usually of sufficient length to carry spacer blocks 1 for several box-blanks (for instance four or five) with spaces between box-blanks to provide the necessary wire extensions at either end of each box-blank to be twisted together to close the box when the box-blank is folded into box form.

Conveyer chains 2 are advanced continuously at substantially a uniform speed by power communicated to the shaft 5 from a hub 9 of a drive pulley 10 on a shaft 11 journaled in side frames 6. The train of mechanism for advancing the conveyer chains 2 is fully illustrated and described in said patent to O. C. Thompson No. 1,669,383, reference to which is hereby made for a detailed description. It is sufficient here to say that rotation of hub 9 of drive pulley 10 causes rotation of sprocket wheels 4 and advancement of chains 2 at substantially a uniform speed.

Drive pulley 10 is revolubly mounted on its hub 9 and a controllable clutch mechanism is provided between drive pulley 10 and its hub 9, which clutch mechanism is controlled by a hand lever 12 to start and stop the machine.

The clutch mechanism for clutching hub 9 to drive pulley 10 is fully shown and described in said patent to Osceola C. Thompson, No. 1,669,383, reference to which is hereby made for a detailed description.

The stapling mechanism is carried by a carriage 13 which is reciprocable over the work and parallel to the movement thereof. Carriage 13 consists of side frames 14 and cross-bars 15, 16 and 17. Side frames 14 are provided with extensions 18 slidable in guideways 19 of machine side frames 6.

Carriage 13 is reciprocated over the work in guideways 19 by eccentrics 20 on shaft 11, each eccentric operating through a bell-crank lever 21 pivotally mounted on a stud shaft 22 on side frame 6 and connected at one end to the eccentric and at the other end to a stud shaft 23 on side frame 14 of carriage 13. The arrangement of the parts is such that upon each revolution of shaft 11, carriage 13 is moved synchronously with the work (during which time the staplers operate to drive a row of staples into the moving work) and is then returned to initial position where it remains stationary until shaft 11 is given another revolution, all as described in said application of Osceola C. Thompson above referred to, reference to which is hereby made for a more detailed description.

The staple-forming and driving mechanism and the binding-wire-guiding mechanism is fully illustrated and described in said patent to O. C. Thompson above referred to, reference to which is hereby made for a detailed description. It is sufficient here to say that each revolution of shaft 11 causes each stapling unit to operate once and drive a staple into the box parts.

Shaft 11 from which the stapling mechanism is operated is caused to rotate by clutching said shaft to the hub 9 of drive pulley 10.

The clutch mechanism for clutching shaft 11 to the hub 9 of drive pulley 10 is best shown in Figs. 6, 7 and 8, and consists of a ring member 24 which fits in a recess formed in hub 9 and carries wedge members 25 adapted to engage a cam 26 keyed to shaft 11. Upon engagement of wedge members 25 with cam 26, hub 9 is locked with shaft 11 and causes shaft 11 to move therewith. The frictional engagement between ring member 24 and hub 9 forces wedge members 25 into wedging engagement with cam 26. To release the wedging engagement and break the connection between hub 9 and shaft 11, ring member 24 is provided with an extension in the form of a block 27 adapted to engage an arm 28 fast on a rock shaft 29 journaled in side frames 6 when said arm 28 is lowered into the path of travel of said block 27. When arm 28 engages block 27, the movement of ring member 24 and wedge members 25 is arrested, thus permitting hub 9 to travel idly around ring member 24.

Figure 5:
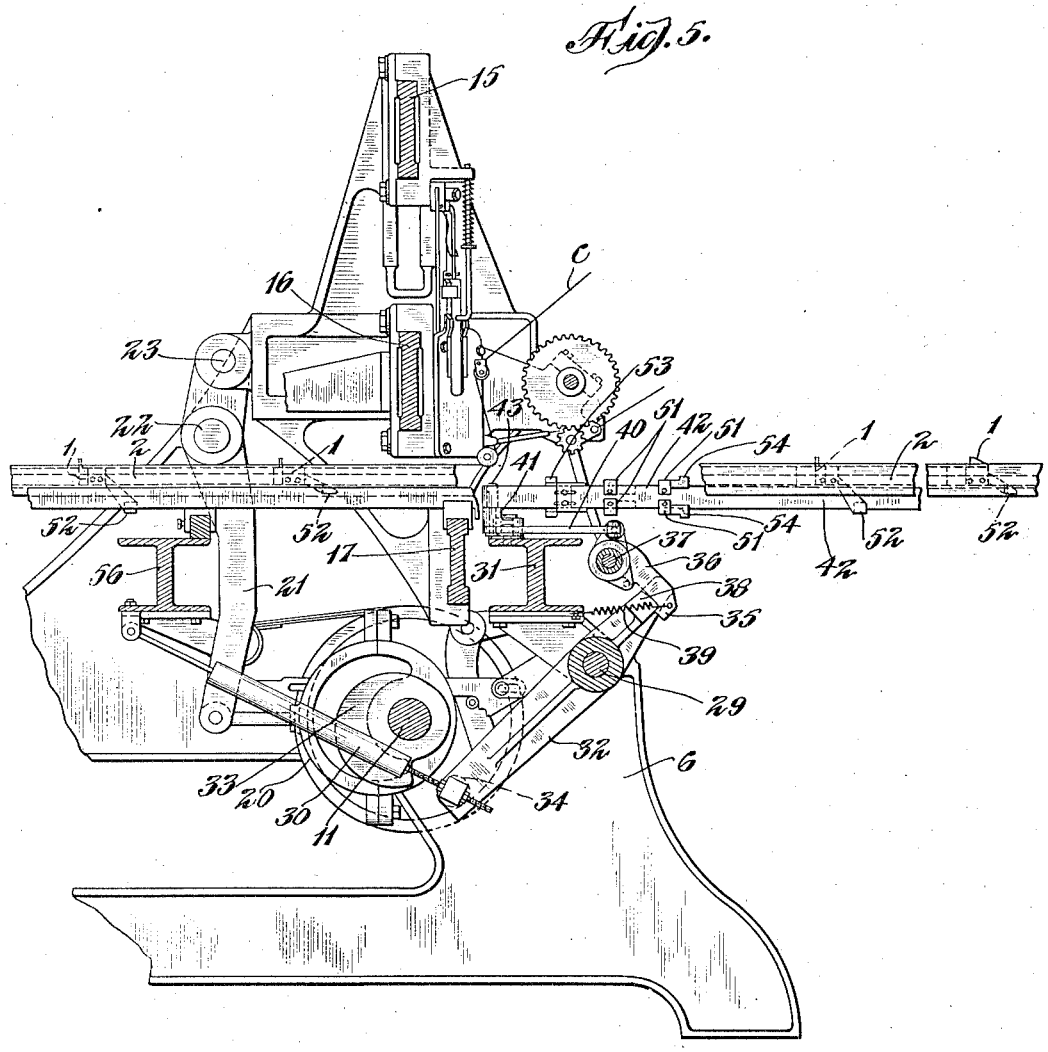
Fig. 5 is a sectional view taken on the line A—A of Fig. 2.

To clutch hub 9 to shaft 11, rock shaft 29 is rocked in a clockwise direction viewing Fig. 5, thus raising arm 28 out of engagement with block 27 on ring member 24. Rock shaft 29 is rocked in a clockwise direction by a spring 30 secured at one end to a cross-bar 56 and at the other end to an arm 32 fast on rock shaft 29 at a point intermediate the ends of arm 32. Rock shaft 29 is rocked in a counter-clockwise direction against the action of spring 30 by a cam 33 fast on shaft 11 acting on a roller 34 on the lower end of arm 32. When cam 33 has rocked shaft 29 in a counter-clockwise direction to throw arm 28 into engagement with block 27 of ring member 24 and break the clutching engagement between hub 9 and shaft 11, the shaft 29 is held in such rocked position by a hook 35 on the lower end of a lever 36 pivotally mounted on a shaft 37 carried by side frames 6, which hook 35 when in lowered position engages and holds a block 38 carried by arm 32. Hook 35 on lever 36 is normally held in lowered position to engage and hold block 38 by a spring 39 secured at one end to hook 35 and at the other end to cross-bar 31. Block 38 has a bevelled face which permits it to raise hook 35 against the action of spring 39 when block 38 is moved against hook 35 by the action of cam 33 on roller 34 of arm 32. When block 38 has passed hook 35, spring 39 will force hook 35 down behind block 38 and prevent spring 30 from rocking shaft 29 until hook 35 is released from its engagement with block 38, as presently to be described. Thus it will be seen that shaft 29 is normally held by hook 35 in such position that arm 38 is in engagement with block 27 of ring member 24, and hub 9 is free to ride idly about shaft 11; and that when hook 35 is released from hooking engagement with block 38, spring 30 will rock shaft 29 and raise arm 28 out of engagement with block 27, thereby clutching shaft 11 to hub 9 for one revolution, cam 33 acting to rock shaft 29 and raise arm 28 upon the completion of each revolution of shaft 11.

Hook 35 is released from engagement with block 38 to permit spring 30 to rock shaft 29 and raise arm 28 out of engagement with block 27 of ring member 24 by raising hook 35 out of engagement with block 38. For this purpose a link 40 connects the upper end of lever 36 to the end of a swinging arm 41 pivotally mounted on cross-bar 31; the ends of link 40 being pivotally connected, respectively, to the lever 36 and the arm 41. A bar 42 is pivotally connected at one end to a pin 43 carried by arm 41 and is pivotally connected at the other end to a pin 44 carried by a swinging arm 45 pivotally mounted on a bracket 46 bolted to support 3. The arrangement is such that movement of bar 42 to the left in Figs. 5, 10 and 11 causes movement of link 40 in the same direction, which movement raises hook 35 out of engagement with block 38. A spring 47 returns bar 42 to initial position after it has raised hook 35 out of engagement with block 38, said spring 47 being secured at one end to pin 44 and at the other end to a bolt 48 threaded through a portion of bracket 46. The action of the spring 47 may be adjusted by turning bolt 48.

Bar 42, which is located adjacent to one of the conveyer chains 2 and parallel therewith, is provided with an upper flange 49 and a lower flange 50 to which staple-control blocks 51 may be adjustably secured by set screws. As shown in Figs. 16 to 24 inclusive, staple-control blocks 51 project into the path of travel of trip members 52 carried by, or formed as a part of, certain of the spacer blocks 1 secured to the adjacent conveyer chain 2. When a trip member 52 engages a staple-control block 51, the bar 42 is moved with trip member 52 until swinging arms 41 and 45 swing bar 42 away from and out of engagement with trip member 52, whereupon spring 47 returns bar 42 to initial position. The movement of bar 42 with trip member 52 causes hook 35 to be raised out of engagement with block 38 thereby clutching shaft 11 to hub 9 of pulley 10 and causing the staplers to drive a row of staples into the work. Thus it will be seen that each time a trip member 52 engages a staple-control block 51 carried by the bar 42, a row of staples will be driven into the work.

The arrangement of the staple-control blocks 51 on the bar 42, and the co-operation therewith of the trip members 52 carried by conveyer chain 2, is shown in Figs. 21 to 24 inclusive. Figs. 21 and 22 disclose the arrangement when a box-blank of four equal sections is being wired and in which three rows of staples are to be driven into each box section. In these figures three staple-control blocks 51 are secured to the upper flange 49 of bar 42 and three staple-control blocks 51 are secured to the lower flange 50 of bar 42. The staple-control blocks 51 on the lower flange 50 lie in the path of the trip members 52 located at the rear edge of the first and third sections of the blank, while staple-control blocks 51 on the upper flange 49 lie in the path of the trip members 52 located at the rear edge of the second and fourth sections of the blank. The trip member 52 at the rear edge of the first section has successively tripped the three staple-control blocks 51 on the lower flange 50 and three rows of staples have been driven into the first section of the blank as illustrated. The trip member 52 at the rear edge of the second section is approaching the staple-control blocks 51 on the upper flange 49 and will engage and trip each block in turn to cause three rows of staples to be driven into the second section of the blank. The trip member 52 at the rear edge of the third section will then engage and operate the staple-control blocks 51 on the lower flange 50 and the trip member 52 at the rear edge of the fourth section will then engage and trip the staple-control blocks 51 on the upper flange 49. The trip members carried by the spacer blocks at the rear edge of succeeding blank sections will similarly operate the staple-control blocks. The number and location of the rows of staples in each section are controlled by the number and location of the staple-control blocks 51 on the bar 42. It is often desirable to manufacture box-blanks in which the first and third sections differ in size from the second and fourth sections. When such a blank is made, a larger number of staples are driven into the wider sections than into the narrower sections. Assuming that the first and third sections are wider than the second and fourth sections and that it is desired to drive five rows of staples into the first and third sections and three rows of staples into the second and fourth sections, then five staple-control blocks will be set on the lower flange 50 and three staple-control blocks will be set on the upper flange 49.

Figs. 23 and 24 illustrate a box-blank in which the first and third sections are comparatively narrow while the second and fourth sections are considerably wider than the length of the bar 42. To accommodate such a character of blank, and assuming that four staples are to be driven into the narrow sections and twenty staples into the wide sections, four staple-control blocks are set on the lower flange 50 to control the location of the staples in the first and third sections, and ten staple-control blocks are located on the upper flange 49 to control the location of the staples in the second and fourth sections, the staple-control blocks 51 on the upper flange being tripped twice while the wider sections are passing beneath the stapling mechanism, first by an additional trip member designated 52$^a$ in Figs. 23 and 24 which is secured to conveyer chain 2 midway of each wide section, and, second, by the trip member carried by the spacer block at the rear edge of each wide section.

To facilitate the setting of the staple-control blocks 51 on the bar 42, the extreme left-hand block on both the upper and lower flanges in Figs. 21 to 24 inclusive, which blocks control the location of the last row of staples in a section, are permanently set on the flanges and the other staple-control blocks 51 which are adjustable may then be positioned with reference to the set blocks.

To assist in locating the adjustable staple-control blocks relative to the first blocks which are permanently set, each of said first blocks is provided with an extension 53 against which a cleat (of the size to be incorporated in the section) may be placed; and each of the last staple-control blocks is provided with an extension 54 to engage the other end of the cleat after it has been placed against the extension 53 on the first block of the series. The intermediate blocks may then be adjusted at points along the cleat where it is desired that staples shall be driven. When the sections of the blank to be wired are of equal width, the same cleat may be used to set the staple-control blocks on both flanges of bar 42. When the first and third sections of the blank are of different width than the second and fourth sections, a cleat of the proper length for the first and third sections is used to set the blocks on the lower flange and a cleat of the proper length for the second and fourth sections is used to set the blocks on the upper flange. The bar 42 may be lifted from the pins 43 and 44 and removed from the machine when it is necessary to change the set-up of the staple-control blocks.

Thus it will be seen that mechanism is provided whereby staples may be accurately positioned at predetermined points relative to each other and to edges of box sections in an uninterrupted succession of box-blanks by setting one pattern of staple-control blocks to control the position of staples in the narrow sections of each blank and another pattern of staple-control blocks to control the position of staples in the wider sections of each blank, the pattern for the narrow sections being tripped by a tripping member located at the rear of each narrow section, and the pattern for the wide sections being tripped by a tripping member located at the rear of each wide section and also by an additional tripping member located midway of the wide sections when the width of such sections is greater than the length of the bar 42.

It will be noted that one of said patterns of staple-control blocks may be dispensed with when the same number of staples similarly spaced are to be driven into each section, in which case a single pattern of staple-control blocks for a single section may be tripped by a trip member at the rear edge of each section of the box-blank.

As the finished blanks pass the stapling plane they ride out on stripper bars 55 which are supported by a cross-bar 56 and uprights (not shown) resting on shaft 5.

Printing mechanisms are located at either side of the machine adjacent each stripper bar 55 and are supported by a bracket 58 secured to cross-bar 56 and resting on shaft 5.

Each printing device is enclosed in a casing 59 carried by bracket 58 and consists of a printing disc 60 having a rubber die 61 about its periphery which is pressed against the cleats of the box-blank as the blank is pushed along the stripper bars 55. The printing disc 60 is mounted on a pivot stud 62 loosely mounted in an opening 63 in casing 59. A disc 64, provided with a felt inking pad 65 around its periphery, is revolubly mounted on a stud bolt 66 secured to casing 59. Printing disc 60 is held in contact with inking disc 64 and the cleats of the passing box-blank by a hairpin-spring 67 carried by a stud 68 mounted in casing 59 in such way as to permit its adjustment to vary the pressure of the spring 67 on the disc 60.

To hold the box-blank on the stripper bars 55 so that the cleats will remain in engagement with printing disc 60, an arm 69 carrying a roller 70 is pivoted to the upper part of the casing 59. The roller 70 is arranged to contact with the top of the box-blank and keep it in contact with the stripper bars 55 through the action of a compression spring 71 which is inserted between the upper part of the casing 59 and the underside of the extremity of arm 69, as best shown in Fig. 27.

Fig. 28 illustrates the manner in which the printing mechanism operates on the cleats of each box-blank as they pass through the machine. The printing of advertising matter on the outer surfaces of the cleats of a blank has many advantages. The outer surfaces of the cleats of the blank are prominently exposed when the blank is folded into box form. Moreover, the outer surface of the cleats is usually the only planed surface of the blank and, therefore, is the smoothest surface and most suitable for printing.

The expressions "continuous" and "continuously", as used in the specification and claims to describe the feed or movement of the work or work-forwarding means, are intended to distinguish from an intermittent or step-by-step feed or movement.

Obviously, the present invention is not limited to the particular embodiment shown and described for illustration, but may be variously embodied, and the particular construction shown may be variously modified, as will appear to those skilled in the art. Furthermore, it is not indispensable that all the features of the invention be used conjointly, since they may be used to advantage in various different combinations and sub-combinations as defined in the sub-joined claims.

Having described the invention, what is claimed is:

1. A machine for use in making boxes, crates or the like comprising, in combination, work-forwarding means having positioning devices for a plurality of units of box parts; fastener-setting mechanism operable to drive fasteners into moving box parts; and means to control the location of fasteners at predetermined points in the work comprising a pattern of controlling members for a single unit of work, and means to trip said pattern a plurality of times to control the location of fasteners in a succession of units of work; said machine being adapted to operate without interruption on a plurality of box assemblies.

2. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pattern of fastener-controlling members, and means to trip said members successively.

3. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pattern of fastener-controlling members, and means movable with the box parts to trip said members successively.

4. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pattern of fastener-controlling members, and a plurality of means each adapted to trip said members successively.

5. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pattern of fastener-controlling members, and a plurality of means movable with the box parts and each adapted to trip said members successively.

6. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pattern of selectively spaced fastener-controlling members each adapted when tripped to cause a fastener-setting operation, and means carried by the work-forwarding means to trip said members successively.

7. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pattern of selectively spaced fastener-controlling members each adapted when tripped to cause a fastener-setting operation, and means movable with the box parts to trip said members successively.

8. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pattern of selectively spaced fastener-controlling members each adapted when tripped to cause a fastener-setting operation, and a plurality of means carried by the work-forwarding means each adapted to trip said members successively.

9. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pattern of selectively spaced fastener-controlling members each adapted when tripped to cause a fastener-setting operation, and a plurality of means movable with the box parts and each adapted to trip said members successively.

10. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pattern of selectively spaced members to control the location of fasteners in a box section, and means movable with the box section to trip said members successively as said box section is passing beneath the fastener-setting mechanism.

11. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pattern of selectively spaced members to control the location of fasteners in a box section, and a plurality of means each located relative to a box section and movable therewith to trip said members as its corresponding box section is passing beneath the fastener-setting mechanism.

12. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a plurality of patterns of fastener-controlling members, and means to trip said patterns successively.

13. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pair of patterns of fastener-controlling members, and means to trip said patterns alternately.

14. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pair of patterns of fastener-controlling members one for a narrow section and one for a wider section, and means to trip the pattern for a narrow section when such a section is passing beneath the fastener-setting mechanism, and means to trip the pattern for a wider section when such a section is passing beneath the fastener-setting mechanism.

15. A machine for use in making boxes, crates or the like comprising, in combination, work-forwarding means adapted to feed box parts continuously; fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of selectively spaced members each adapted when tripped to cause a fastener-setting operation, and means carried by the work-forwarding means to trip said members successively.

16. A machine for use in making boxes, crates or the like comprising, in combination, work-forwarding means adapted to feed box parts continuously; fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of selectively spaced members each adapted when tripped to cause a fastener-setting operation, and means movable with the box parts to trip said members successively.

17. A machine for use in making boxes, crates or the like comprising, in combination, work-forwarding means adapted to feed box parts continuously; fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of members selectively spaced in accordance with the desired spacing of fasteners in the work and each adapted when tripped to cause a fastener-setting operation, and means carried by the work-forwarding means to trip said members successively.

18. A machine for use in making boxes, crates or the like comprising, in combination, work-forwarding means adapted to feed box parts continuously; fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of members selectively spaced in accordance with the desired spacing of fasteners in the work and each adapted when tripped to cause a fastener-setting operation, and means movable with the box parts to trip said members successively.

19. A machine for use in making boxes, crates or the like comprising, in combination, work-forwarding means adapted to feed box parts continuously; fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of selectively spaced members equal in number to the number of fasteners to be driven into a unit of work and each member adapted when tripped to cause a fastener-setting operation, and means carried by the work-forwarding means to trip said members successively.

20. A machine for use in making boxes, crates or the like comprising, in combination, work-forwarding means adapted to feed box parts continuously; fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of selectively spaced members equal in number to the number of fasteners to be driven into a unit of work and each member adapted when tripped to cause a fastener-setting operation, and means movable with the box parts to trip said members successively.

21. A machine for use in making boxes, crates or the like comprising, in combination, work-forwarding means adapted to feed box parts continuously; fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of selectively spaced members equal in number to the number of fasteners to be driven into a unit of work and each adapted when tripped to cause a fastener-setting operation, and a plurality of tripping means carried by the work-forwarding means each tripping means being located relative to a unit of work and adapted to trip said members successively when its corresponding unit of work is passing beneath the fastener-setting mechanism.

22. A machine for use in making boxes, crates or the like comprising, in combination, work-forwarding means adapted to feed box parts continuously; fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of series of selectively spaced members each member adapted when tripped to cause a fastener-setting operation and each series having members corresponding in number to the number of fasteners to be driven into a particular sized unit of work, and a plurality of tripping means carried by the work-forwarding means each tripping means being located relative to a unit of work and adapted to trip successively the members of one of said series of members when its corresponding unit of work is passing beneath the fastener-setting mechanism.

23. A machine for use in making boxes, crates or the like comprising, in combination, a work-conveyer having blocks thereon to position and feed the box parts; means to feed the work-conveyer continuously at approximately a uniform speed; fastener-setting mechanism normally inactive during the passage of the box parts thereunder; and mechanism for causing operations of the fastener-setting mechanism at predetermined intervals to drive fasteners into the box parts at predetermined points comprising a series of selectively spaced members each adapted in turn to be tripped by a block and thereby cause a fastener-setting operation.

24. A machine for use in making boxes, crates or the like comprising, in combination, work-forwarding means; fastener-setting mechanism normally inactive during the passage of the box parts thereunder; and means to cause the fastener-setting mechanism to operate at selected times to drive fasteners into the work at predetermined points comprising a rod adapted when tripped to cause a fastener-setting operation, a series of selectively spaced lugs carried by said rod, and means carried by the work-forwarding means to engage said lugs successively and thereby trip said rod.

25. A machine for use in making boxes, crates or the like comprising, in combination, means to position a plurality of box sections in foldable relationship; means to feed the box sections continuously; fastener-setting mechanism normally inactive and adapted to be thrown into operation at selected times to drive fasteners into the moving work at predetermined points; and mechanism for causing the fastener-setting mechanism to drive a definite number of fasteners at predetermined points into each box section comprising a pattern of fastener-controlling members for a box section adapted to be operated by the positioning means as each box section is passing beneath the fastener-setting mechanism.

26. A machine for use in making boxes, crates or the like comprising, in combination, means to position a plurality of box sections in foldable relationship; means to feed the box sections continuously at approximately a uniform speed; fastener-setting mechanism normally inactive and adapted to be thrown into operation at selected times to drive fasteners into the moving work at predetermined points; and mechanism for causing the fastener-setting mechanism to drive a definite number of fasteners at predetermined points into each box section comprising a pair of patterns of fastener-controlling members each for a box section and adapted to be operated alternately by the work-positioning means.

27. A machine for use in making boxes, crates or the like comprising, in combination, work-forwarding means; fastener-setting mechanism operable to drive fasteners into box parts; and fastener-positioning means to control the location of fasteners at predetermined points in the box parts comprising a pattern of selectively spaced fastener-controlling members for half a unit of work each member adapted when tripped to cause a fastener-setting operation, and means carried by the work-forwarding means to trip said pattern of members twice while a unit of work is passing beneath the fastener-setting mechanism.

28. A machine for use in making boxes, crates or the like comprising, in combination, work-forwarding means; binding-wire-applying means including fastener-setting mechanism operable to drive fasteners over binding wire into box parts; and fastener-positioning means to control the location of fasteners at predetermined points in the box parts comprising a pattern of fastener-controlling members, and means to trip said members successively.

29. A machine for use in making boxes, crates or the like comprising, in combination, work-forwarding means; binding-wire-applying means including fastener-setting mechanism operable to drive fasteners over binding wire into box parts; and fastener-positioning means to control the location of fasteners at predetermined points in the box parts comprising a pattern of fastener-controlling members, and means movable with the box parts to trip said members successively.

30. A machine for use in making boxes, crates or the like comprising, in combination, work-forwarding means; binding-wire-applying means including fastener-setting mechanism operable to drive fasteners over binding wire into box parts; and fastener-positioning means to control the location of fasteners at predetermined points in the box parts comprising a pattern of selectively spaced fastener-controlling members each adapted when tripped to cause a fastener-setting operation, and means movable with the box parts to trip said members successively.

31. A machine for use in making boxes, crates or the like comprising, in combination, work-forwarding means; binding-wire-applying means including fastener-setting mechanism operable to drive fasteners over binding wire into box parts; and fastener-positioning means to control the location of fasteners at predetermined points in the box parts comprising a pattern of selectively spaced fastener-controlling members each adapted when tripped to cause a fastener-setting operation, and a plurality of means movable with the box parts and each adapted to trip said members successively.

32. A machine for use in making boxes, crates or the like comprising, in combination, work-forwarding means; binding-wire-applying means including fastener-setting mechanism operable to drive fasteners over binding wire into box parts; and fastener-positioning means to control the location of fasteners at predetermined points in the box parts comprising a pattern of selectively spaced members to control the location of fasteners in a box section, and a plurality of means each located relative to a box section and movable therewith to trip said members as its corresponding box section is passing beneath the fastener-setting mechanism.

33. A machine for use in making boxes, crates or the like comprising, in combination, work-forwarding means; binding-wire-applying means including fastener-setting mechanism operable to drive fasteners over binding wire into box parts; and fastener-positioning means to control the location of fasteners at predetermined points in the box parts comprising a plurality of patterns of fastener-controlling members and means to trip said patterns successively.

34. A machine for use in making boxes, crates or the like comprising, in combination, work-forwarding means; binding-wire-applying means including fastener-setting mechanism operable to drive fasteners over binding wire into box parts; and fastener-positioning means to control the location of fasteners at predetermined points in the box parts comprising a pair of patterns of fastener-controlling members, and means to trip said patterns alternately.

35. A machine for use in making boxes, crates or the like comprising, in combination, work-forwarding means; binding-wire-applying means including fastener-setting mechanism operable to drive fasteners over binding wire into box parts; and fastener-positioning means to control the location of fasteners at predetermined points in the box parts comprising a pair of patterns of fastener-controlling members one for a narrow section and one for a wider section, and means to trip the pattern for a narrow section when such a section is passing beneath the fastener-setting mechanism, and means to trip the pattern for a wider section when such a section is passing beneath the fastener-setting mechanism.

36. A machine for use in making boxes, crates or the like comprising, in combination, work-forwarding means adapted to feed box parts continuously; binding-wire-applying means including fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of selectively spaced members each adapted when tripped to cause a fastener-setting operation, and means carried by the work-forwarding means to trip said members successively.

37. A machine for use in making boxes, crates or the like comprising, in combination, work-forwarding means adapted to feed box parts continuously; binding-wire-applying means including fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of members selectively spaced in accordance with the desired spacing of fasteners in the work and each adapted when tripped to cause a fastener-setting operation, and means movable with the box parts to trip said members successively.

38. A machine for use in making boxes, crates or the like comprising, in combination, work-forwarding means adapted to feed box parts continuously; binding-wire-applying means including fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of selectively spaced members equal in number to the number of fasteners to be driven into a unit of work and each member adapted when tripped to cause a fastener-setting operation, and means movable with the box parts to trip said members successively.

39. A machine for use in making boxes, crates or the like comprising, in combination, work-forwarding means adapted to feed box parts continuously; binding-wire-applying means including fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of selectively spaced members equal in number to the number of fasteners to be driven into a unit of work and each adapted when tripped to cause a fastener-setting operation, and a plurality of tripping means carried by the work-forwarding means each tripping means being located relative to a unit of work and adapted to trip said members successively when its corresponding unit of work is passing beneath the fastener-setting mechanism.

40. A machine for use in making boxes, crates or the like comprising, in combination, work-forwarding means adapted to feed box parts continuously; binding-wire-applying means including fastener-setting mechanism normally inactive during the feed of the box parts thereunder; and mechanism for causing the fastener-setting mechanism to operate upon the moving box parts at predetermined intervals to drive fasteners into the box parts at predetermined points comprising a plurality of series of selectively spaced members each member adapted when tripped to cause a fastener-setting operation and each series having members corresponding in number to the number of fasteners to be driven into a particular sized unit of work, and a plurality of tripping means carried by the work-forwarding means each tripping means being located relative to a unit of work and adapted to trip successively the members of one of said series of members when its corresponding unit of work is passing beneath the fastener-setting mechanism.

41. A machine for use in making boxes, crates or the like comprising, in combination, a work-conveyer having blocks thereon to position and feed the box parts; means to feed the work-conveyer continuously; binding-wire-applying means including fastener-setting mechanism normally inactive during the passage of the box parts thereunder; and mechanism for causing operations of the fastener-setting mechanism at predetermined intervals to drive fasteners into the box parts at predetermined points comprising a series of selectively spaced members each adapted in turn to be tripped by a block and thereby cause a fastener-setting operation.

42. A machine for use in making boxes, crates or the like comprising, in combination, means to position a plurality of box sections in foldable relationship; means to feed the box sections continuously; binding-wire-applying means including fastener-setting mechanism normally inactive and adapted to be thrown into operation at selected times to drive fasteners into the moving work at predetermined points; and mechanism for causing the fastener-setting mechanism to drive a definite number of fasteners at predetermined points into a plurality of sections comprising a pattern of fastener-controlling members for a box section adapted to be operated by the positioning means as each of said plurality of box sections is passing beneath the fastener-setting mechanism.

43. A machine for use in making boxes, crates or the like comprising, in combination, means to position a plurality of box sections in foldable relationship; means to feed the box sections continuously; binding-wire-applying means including fastener-setting mechanism normally inactive and adapted to be thrown into operation at selected times to drive fasteners into the moving work at predetermined points; and mechanism for causing the fastener-setting mechanism to drive a definite number of fasteners at predetermined points into each box section comprising a pair of patterns of fastener-controlling members each pattern for a box section and adapted to be operated alternately by the work-positioning means.

44. A machine for use in making boxes, crates or the like comprising, in combination, work-forwarding means; binding-wire-applying means including fastener-setting mechanism operable to drive fasteners into box parts; and fastener-positioning means to control the location of fasteners at predetermined points in the box parts comprising a pattern of selectively spaced fastener-controlling members for half a unit of work each member adapted when tripped to cause a fastener-setting operation, and means carried by the work-forwarding means to trip said pattern of members twice while a unit of work is passing beneath the fastener-setting mechanism.

45. A machine for use in making boxes, crates or the like, comprising, in combination, work-feeding means; fastener-setting mechanism normally inactive during the feed of the box parts thereunder; and mechanism for causing the fastener-setting mechanism to operate at selected times to drive fasteners into the box parts at predetermined points, comprising a plurality of spaced members, each adapted, when tripped, to cause a fastener-setting operation, and means to trip said members successively.

In testimony whereof, I have signed my name to this specification.

OSCEOLA C. THOMPSON.